United States Patent
Petcavich et al.

(10) Patent No.: US 8,053,081 B2
(45) Date of Patent: Nov. 8, 2011

(54) CUTTING TOOL

(75) Inventors: Robert Petcavich, Kirkland, WA (US);
Eric L. Hanson, Carlsbad, CA (US);
Eric L. Bruner, San Diego, CA (US)

(73) Assignee: Aculon, Inc., San Diego, CA (US)

( * ) Notice: Subject to any disclaimer, the term of this patent is extended or adjusted under 35 U.S.C. 154(b) by 723 days.

(21) Appl. No.: 12/080,058

(22) Filed: Mar. 31, 2008

(65) Prior Publication Data

US 2008/0244908 A1    Oct. 9, 2008

Related U.S. Application Data

(60) Provisional application No. 60/921,770, filed on Apr. 4, 2007, provisional application No. 60/921,771, filed on Apr. 4, 2007.

(51) Int. Cl.
*B26B 21/60* (2006.01)

(52) U.S. Cl. ............... 428/457; 30/346; 428/704

(58) Field of Classification Search .......... None
See application file for complete search history.

(56) References Cited

U.S. PATENT DOCUMENTS

| | | | |
|---|---|---|---|
| 2,937,976 A | 5/1960 | Granahan et al. | 167/85 |
| 3,071,856 A | 1/1963 | Fischbein | 30/346 |
| 3,518,110 A | 6/1970 | Fischbein | 117/93.4 |
| 3,658,742 A | 4/1972 | Fish et al. | 260/29.6 F |
| 4,012,551 A | 3/1977 | Bogaty et al. | 428/192 |
| 4,330,576 A | 5/1982 | Dodd | 427/255.1 |
| 5,005,287 A | 4/1991 | Ritter | 30/41 |
| 5,088,202 A | 2/1992 | Boland et al. | 30/346.54 |
| 5,129,289 A | 7/1992 | Boland et al. | 76/104.1 |
| 5,263,256 A | 11/1993 | Trankiem | 30/346.54 |
| 5,275,672 A | 1/1994 | Althaus et al. | 148/325 |
| 5,477,756 A | 12/1995 | Trankiem et al. | 76/104.1 |
| 5,518,818 A * | 5/1996 | Kidai et al. | 428/412 |
| 5,645,894 A | 7/1997 | Trankiem | 427/421 |
| 5,985,459 A | 11/1999 | Kwiecien et al. | 428/421 |
| 6,110,532 A | 8/2000 | Causton et al. | 427/284 |
| 6,130,309 A | 10/2000 | Reich et al. | 528/76 |
| 6,228,428 B1 | 5/2001 | Trankiem | 427/284 |
| 6,468,642 B1 | 10/2002 | Bray et al. | 428/216 |
| 6,794,027 B1 * | 9/2004 | Araki et al. | 428/336 |
| 6,866,894 B2 | 3/2005 | Trankiem et al. | 427/385.5 |
| 6,887,578 B2 | 5/2005 | Gleason et al. | 428/447 |
| 7,060,367 B2 | 6/2006 | Yamada et al. | 428/634 |
| 7,147,931 B2 | 12/2006 | Stigenberg et al. | 428/615 |
| 2005/0268470 A1* | 12/2005 | Skrobis et al. | 30/346.54 |

FOREIGN PATENT DOCUMENTS

| | | |
|---|---|---|
| DE | 1 545 023 A1 | 4/1971 |
| GB | 906005 | 9/1962 |
| GB | 1416887 A * | 12/1975 |
| WO | WO 2005/070627 A1 | 8/2005 |

OTHER PUBLICATIONS

Alsten, Self-Assembled Monolayers on Engineering Metals: Struture, Derivatization, and Utility, Langmuir, 1999, vol. 15 pp. 7605-7614.*

(Continued)

*Primary Examiner* — Timothy Speer
*Assistant Examiner* — Adam Krupicka
(74) *Attorney, Agent, or Firm* — William J. Uhl

(57) ABSTRACT

A cutting tool having a cutting edge with a layer of an organophosphorus compound is disclosed.

23 Claims, 3 Drawing Sheets

OTHER PUBLICATIONS

Database CAPLUS; Chemical Abstracts Service, Columbus, Ohio, US; Polim. Tekhnol. Protsessakh Obrab. Met. (1977), May 12, 1984, E. A. Stanchuk et al.: "Use of Organophosphorus Polymers Machining of Metals"; XP002515861; 117-20; Editor(s): Yu. S. Lipatov; Publisher: "Naukova Dumka", Kiev, USSR; AN-1978:408625, DN-89:8625, abstract.

* cited by examiner

CUTTING TOOL

CROSS REFERENCE TO RELATED APPLICATION

The present application claims priority from U.S. Provisional Patent Application Ser. Nos. 60/921,770 and 60/921,771, both filed Apr. 4, 2007.

FIELD OF THE INVENTION

The present invention relates to a cutting tool having a cutting edge, and more particularly relates to such a cutting tool with an organic layer to protect the cutting edge.

BACKGROUND OF THE INVENTION

The preservation of sharp edges is important for many products and industries. Many industrial blades and medical tools are only useful if their sharp edges can be maintained for reasonably long periods of time. The sharpness is the result of the precision of the edge formed by the substrate and any coatings thereon. Razor blades, for example, have an edge formed by producing a radius of curvature at the blade's extreme tip from about 75 to about 1000 angstroms.

Corrosive and/or errosive forces can cause precision edge degradation. Razor blades, for example, dull considerably after first use.

The corrosive and/or errosive forces cause cracks, chips or breaks at the edge causing a jagged edge. For razor blades, the degradation of the precision edge causes increased friction and user discomfort. To overcome these problems the steel used for razor blades is therefore often coated first with a sputtered hard metal coating, followed by a coating of polytetrafluoroethylene (PTFE). The PTFE coating is usually tens to thousands of angstroms thick, and it is substantially removed from the blade upon first use. Enough PTFE survives to provide a measure of continued lubrication. However, the PTFE coatings do not prevent the degradation of the precision edge.

Also depositing of hard coatings is not entirely effective in preserving edge integrity. For example, a coating of platinum, titanium, chromium, chromium oxide or chromium nitride may be applied to a cutting edge to prolong its life. However, such hard coatings do not overcome the problem of corrosion that occurs at the grain boundary and corrosion that forms between the coating and the substrate.

Self-assembled monolayers have attracted attention in many areas because of the versatility they provide for surface modification. Self-assembled monolayers are highly ordered molecular assemblies that form spontaneously by chemisorption of functionalized molecules on a variety of substrates. The self-assembled monolayers as the name implies are very thin and of molecular thickness and their robustness and durability is questionable. They are often used in electronic applications to adhere dissimilar materials such as electrically conductive and dielectric layers. In such an application robustness and durability is not critical.

SUMMARY OF THE INVENTION

The present invention is a tool having at least one cutting edge such as a razor blade and a coating comprising an organophosphorus compound applied to the cutting edge.

The organophosphorus compound adheres well to the cutting edge such that it is not easily removed resulting in the cutting edge retaining a high level of cutting quality. Optionally, the organophosphorus compound can indirectly be adhered to the cutting edge through an intermediate organometallic coating. With certain substrates, particularly metals, the organometallic coating provides superior adhesion of the organophosphorus compound to the cutting edge.

In a preferred embodiment, the organophosphorus layer on the cutting edge is in the form of a self-assembled monolayer (SAM). Although being of nanometer dimensions, the self-assembled monolayer is robust and adheres well to the cutting edge such that it is not easily removed resulting in the cutting edge retaining a high level of cutting quality.

DETAILED DESCRIPTION

Figure 1B:
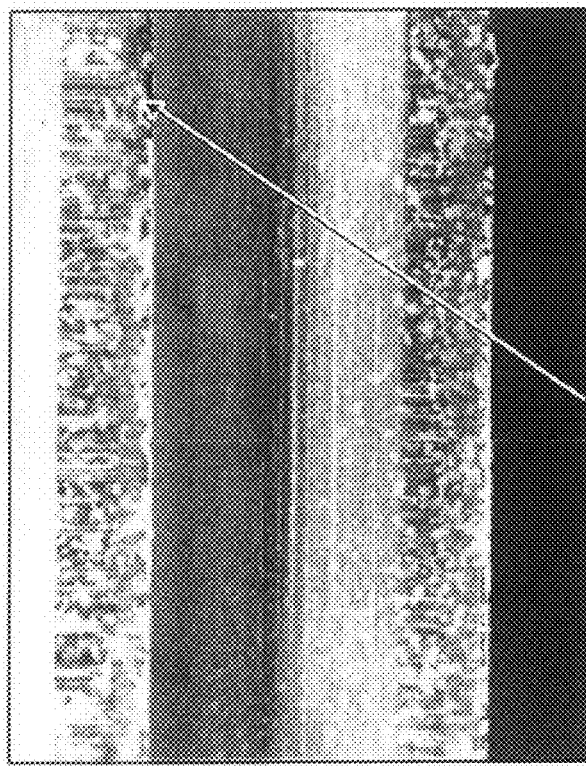
FIG. 1 is a Scanning Electron Micrograph (100×) of the cutting edges of two razor blades that have been subjected to five (5) shaves. The blade to the left ("A") was coated with an organophosphorus compound in accordance with the invention. The blade on the right ("B") was uncoated.

For purposes of the following detailed description, it is to be understood that the invention may assume various alternative variations and step sequences, except where expressly specified to the contrary. Moreover, other than in any operating examples, or where otherwise indicated, all numbers expressing, for example, quantities of ingredients used in the specification and claims are to be understood as being modified in all instances by the term "about". Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

In this application, the use of the singular includes the plural and plural encompasses singular, unless specifically stated otherwise. In addition, in this application, the use of "or" means "and/or" unless specifically stated otherwise, even though "and/or" may be explicitly used in certain instances.

The term "polymer" is also meant to include copolymer and oligomer.

The cutting tools of the present invention are characterized by one or more cutting edges, such as elongated cutting edges.

As used herein a "cutting edge" is the area of ultimate narrowing of a substrate, resulting in the convergence of two sides of the substrate to achieve a small radius of curvature at a tip. A small radius of curvature is understood to be one of from about 25 angstroms up to several microns. For very sharp blades, the radius of curvature is from about 75 angstroms to about 1000 angstroms. For otherless sharp cutting tools, the radius at the tip may be up to hundreds of microns, while still being considered a cutting edge.

Examples of such cutting tools are knives, saw blades, scissors, pruning shears, scalpels, and razor blades.

The cutting tools are typically made from metals such as carbon steel or stainless steel to which may be applied a hard coating of other metals and materials such as chromium, platinum, titanium, chromium oxide, chromium nitride, aluminum oxide, etc. See, for example, U.S. Pat. No. 3,754,329.

Besides metals, the cutting tool may be fabricated from other materials such as ceramic materials.

Preferably, the substrates have functional groups on their surface that are reactive with functional groups associated with the organophosphorus compound. Non-limiting examples of such groups are those that are capable of accepting a proton from the organophosphorus compound, such as hydroxyl groups and oxo groups.

Non-limiting examples of such substrates are those which inherently have such groups on their surface or which form such groups by subsequent treatment such as exposure to the environment or a plasma treatment. Examples of materials which form metal oxide surfaces upon exposure to ambient conditions include iron, steels, including stainless steels and metals which acquire a non-ablating oxide coating upon exposure to the ambient environment, for example, tantalum, titanium, titanium alloys, aluminum, and aluminum alloys. Additional examples of materials that acquire an oxide layer upon exposure to the ambient conditions are ceramic materials, for example, silicon nitride. Also suitable in the method of the present invention are materials which have an oxide coating imparted to them, for example, a hard metal oxide such as aluminum oxide applied to a substrate by sputtering.

Examples of suitable organophosphorus compounds are organophosphoric acids, organophosphonic acids and/or organic phosphinic acids including derivatives thereof. Examples of derivatives are materials that perform similarly as acids such as acid salts, acid esters and acid complexes. The organo group of the phosphorus acid may be monomeric or polymeric (that includes oligomeric).

Examples of phosphoric acids are compounds or a mixture of compounds having the following structure:

$(R''O)_xP(O)(OR')_y$ wherein x is 1-2, y is 1-2 and x+y=3, R" is an organic radical preferably containing fluorine and may be monomeric or polymeric. Examples of monomeric radicals are those having a total of 1-30, such as 6-18 carbons, where R' is H, a metal such as an alkali metal, for example, sodium or potassium or lower alkyl having 1 to 4 carbons, such as methyl or ethyl. Preferably, a portion of R' is H. R''' can be aliphatic, aromatic or mixed aliphatic/aromatic. R can be an unsubstituted hydrocarbon or a substituted hydrocarbon.

Example of monomeric phosphonic acids are compounds or mixture of compounds having the formula:

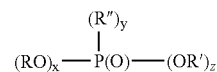

wherein x is 0-1, y is 1, z is 1-2 and x+y+z is 3. R" is organic radical preferably containing fluorine and may be monomeric or polymeric. Examples of monomeric radicals are those having a total of 1-30, such as 6-18 carbons. R' and R are H, a metal, such as an alkali metal, for example, sodium or potassium or lower alkyl having 1-4 carbons such as methyl or ethyl or a base such as an amine. Preferably at least a portion of R' and R is H. R can be aliphatic, aromatic or mixed aliphatic/aromatic. R" can be an unsubstituted hydrocarbon or a substituted hydrocarbon.

Example of monomeric phosphinic acids are compounds or mixture of compounds having the formula:

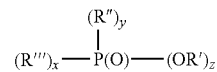

wherein x is 0-2, y is 0-2, z is 1 and x+y+z is 3. Preferably, R and R" are each independently organic radicals preferably containing fluorine and may be monomeric or polymeric. Examples of monomeric radicals are those having a total of 1-30, such as 6-18 carbons. R' is H, a metal, such as an alkali metal, for example, sodium or potassium or lower alkyl having 1-4 carbons, such as methyl or ethyl. Preferably a portion of R' is H. The organic component of the phosphinic acid (R, R") can be aliphatic, aromatic or mixed aliphatic/aromatic. R and R" can be an unsubstituted hydrocarbon or a substituted hydrocarbon.

Representative of the organophosphorous acids are as follows: amino trismethylene phosphonic acid, aminobenzylphosphonic acid, 3-amino propyl phosphonic acid, O-aminophenyl phosphonic acid, 4-methoxyphenyl phosphonic acid, aminophenylphosphonic acid, aminophosphonobutyric acid, aminopropylphosphonic acid, benzhydrylphosphonic acid, benzylphosphonic acid, butylphosphonic acid, carboxyethylphosphonic acid, diphenylphosphinic acid, dodecylphosphonic acid, ethylidenediphosphonic acid, heptadecylphosphonic acid, methylbenzylphosphonic acid, naphthylmethylphosphonic acid, octadecylphosphonic acid, octylphosphonic acid, pentylphosphonic acid, phenylphosphinic acid, phenylphosphonic acid, bis-(perfluoroheptyl) phosphinic acid, perfluorohexyl phosphonic acid, styrene phosphonic acid, dodecyl bis-1,12-phosphonic acid, poly(hexafluoropropylene oxide) phosphonic acid, poly(ethylene glycol) phosphonic acid, perfluorostyrenephosphonic acid.

In addition to the monomeric organophosphorous acids, oligomeric or polymeric organophosphorous acids resulting from self-condensation of the respective monomeric acids may be used.

To provide optimum corrosion resistance and also to provide lubricity to the cutting edge, which is important for applications such as razor blades, the organo portion of the organophosphorus compound contains fluoride, preferably a perfluoro group. Preferred perfluorinated polymeric (includes oligomeric) radicals have a number average molecular weight of less than 2000. The perfluorinated material can be a perfluorinated compound of the following structure:

where $R_f$ is a perfluorinated alkyl group or a perfluorinated alkylene ether group and p is 0 to 20, preferably 1 to 10, more preferably 2 to 4, and most preferably 3. Z is a phosphorus acid group or derivative thereof.

Examples of perfluoroalkyl groups are those of the structure:

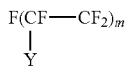

where Y is F or $C_nF_{2n+1}$; m is 2 to 20 and n is 1 to 20.

Preferably the perfluoro group is a perfluoroalkylene ether group of the structure:

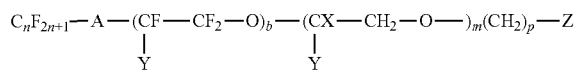

where A is an oxygen radical or a chemical bond; n is 1 to 20, preferably 1 to 6 and more preferably 1 to 2; Y is H, F, $C_nH_{2n+1}$ or $C_nF_{2n+1}$; b is at least 1, preferably at least 2, more preferably 2 to 50 and most preferably 5 to 12; X is H or F; m is 0 to 50, preferably 0 to 20, more preferably 0 to 6 and p is 0 to 20, preferably 1 to 10, more preferably 2 to 4 and most preferably 3.

Z is a phosphorous acid group or a derivative thereof such as those of the structure:

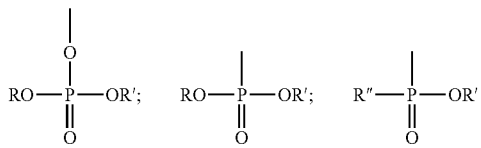

where R, R' and R" are as described above.

For application to the surface of the substrate, the organophosphorus compound is dissolved in a liquid diluent. The concentration is typically dilute, for example, no greater than 10 percent on a weight/volume basis, and preferably is within the range of 0.01 to 1.0 percent. The percentages are based on total weight or volume of the solution.

Examples of suitable diluents are hydrocarbons such as hexane isooctane and toluene; ketones such as methyl ethyl ketone; alcohols such as methanol and ethanol; ethers such as tetrahydrofuran. For fluoro substituted organophosphorus compounds, fluorinated solvents are preferred. Examples include nonafluorobutylmethyl ether available as HFE-7100, supplied by 3M Innovative Products and fluorinated solvents such as hexafluoropropylene oxide and oligomers and polymers of perfluorinated ethers supplied by Solvay Solexis under the trademark GALDEN. The fluorinated solvents can be used in admixtures with the other solvents mentioned above. Preferably, the vapor pressure of the diluent is high, permitting rapid evaporation at room temperature (20-25° C.). The overlayer material can be dissolved easily upon adding the overlayer material to the diluent.

The solution of the organophosphorus compound can be applied to the surface of the optical article by dipping, rolling, spraying or wiping. After application of the organophosphorus compound, the diluent is permitted to evaporate, with or without wiping during evaporation, preferably at ambient temperature, or optionally by the application of heat.

The resultant layer typically is thin, having a thickness of 100 nanometers or less, in the case of SAMs 10 nanometers or less, such as 5 nanometers or less, such as 0.1 to 5 nanometers. The resultant layer adheres very well to the substrate and is extremely effective in preserving the cutting quality of the cutting edge.

The resultant layer is hydrophobic, having a water contact angle less than 70°, typically from 75-130°. The water contact angle can be determined using a contact angle goniometer such as a TANTEC contact angle meter Model CAM-MICRO.

It is believed that the organophosphorus compound forms a self-assembled layer that may be at least in part a monolayer on the surface of the substrate. Self-assembled layers or films are formed by the adsorption and spontaneous organization of the organophosphorus compound on the surface of the cutting tool. The organophosphorus compounds are amphiphilic molecules that have two functional groups. The first functional group, i.e., the head functional group, is the acid group Z in the structures above that covalently bonds to the substrate through reaction with the oxide and/or hydroxyl groups. The second functional group, i.e., the tail, the organo groups, for example, the $R_f(CH_2)_p$ shown above extends outwardly from the surface of the substrate. It is believed that this configuration even in monolayer dimension is very effective in protecting the cutting edge from corrosion and maintaining its cutting ability.

Optionally, the cutting tool can have excess organophosphorus compound on the monolayer surface. If the monolayer is damaged, the excess organophosphorus compound is available for repair by forming a monolayer over the damaged area.

Also, a subsequent layer of a different material may be formed over the monolayer. Examples of different materials would be a polytetrafluoroethylene coating or a polysiloxane coating.

As mentioned above, the organophosphorus compound can be applied directly to the substrate or can be applied indirectly to the substrate through an intermediate organometallic coating. When better adhesion and durability is desired, an organometallic coating may be applied to the substrate, particularly a metal substrate, followed by application of the organophosphorus compound.

The organometallic compound is preferably derived from a metal or metalloid, preferably a transition metal, selected from Group III and Groups IIIB, IVB, VB and VIB of the Periodic Table. Transition metals are preferred, such as those selected from Groups IIIB, IVB, VB and VIB of the Periodic Table. Examples are tantalum, titanium, zirconium, lanthanum, hafnium and tungsten. The organo portion of the organometallic compound is selected from those groups that are reactive with functional groups, such as acid groups (or their derivatives) of the organophosphorus compound. Also, as will be described later, the organo group of the organometallic compound is believed to be reactive with groups on the substrate surfaces being treated such as oxide and hydroxyl groups. Examples of suitable organo groups of the organometallic compound are alkoxide groups containing from 1 to 18, preferably 2 to 4 carbon atoms, such as ethoxide, propoxide, isopropoxide, butoxide, isobutoxide, tertbutoxide and ethylhexyloxide. Mixed groups such as alkoxide, acetyl acetonate and chloride groups can be used.

The organometallic compounds can be in the form of simple alkoxylates or polymeric forms of the alkoxylate, and various chelates and complexes. For example, in the case of titanium and zirconium, the organometallic compound can include:

a. alkoxylates of titanium and zirconium having the general formula $M(OR)_4$, wherein M is selected from Ti and Zr and R is $C_{1-18}$ alkyl, b. polymeric alkyl titanates and zirconates obtainable by condensation of the alkoxylates of (a), i.e., partially hydrolyzed alkoxylates of the general formula $RO[-M(OR)_2O-]_{x-1}R$, wherein M and R are as above and x is a positive integer, c. titanium chelates, derived from ortho titanic acid and polyfunctional alcohols containing one or more additional hydroxyl, halo, keto, carboxyl or amino groups capable of donating electrons to titanium. Examples of these chelates are those having the general formula $$Ti(O)_a(OH)_b(OR')_c(XY)_d$$

wherein a=4−b−c−d; b=4−a−c−d; c=4−a−b−d; d=4−a−b−c; R' is H, R as above or X—Y, wherein X is an electron donating group such as oxygen or nitrogen and Y is an aliphatic radical having a two or three carbon atom chain such as i. —$CH_2CH_2$—, e.g., of ethanolamine, diethanolamine and triethanolamine,

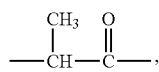

ii. e.g., of lactic acid,

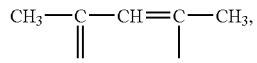

iii. e.g., of acetylacetone enol form, and

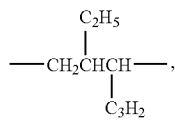

iv. e.g., as in 1,3-octyleneglycol, d. titanium acylates having the general formula $Ti(OCOR)_{4-n}(OR)_n$ wherein R is $C_{1-18}$ alkyl as above and n is an integer of from 1 to 3, and polymeric forms thereof, e. mixtures thereof.

The organometallic compound is usually dissolved or dispersed in a diluent. Examples of suitable diluents are alcohols such as methanol, ethanol and propanol, aliphatic hydrocarbons, such as hexane, isooctane and decane, ethers, for example, tetrahydrofuran and dialkyl ethers such as diethyl ether. Alternatively, the organometallic compound can be applied by vapor deposition techniques.

Also, adjuvant materials may be present with the organometallic compound and the diluent (organometallic compositions). Examples include stabilizers such as sterically hindered alcohols, surfactants and anti-static agents. The adjuvants if present are present in amounts of up to 30 percent by weight based on the non-volatile content of the composition.

The concentration of the organometallic compound in the composition is not particularly critical but is usually at least 0.01 millimolar, typically from 0.01 to 100 millimolar, and more typically from 0.1 to 50 millimolar.

The organometallic treating composition can be obtained by mixing all of the components at the same time or by combining the ingredients in several steps. Since the organometallic compound is reactive with moisture, care should be taken that moisture is not introduced with the diluent or adjuvant materials and that mixing is conducted in a substantially anhydrous atmosphere.

The organometallic composition can be applied to the substrate surface by conventional means such as immersion coating such as dipping, rolling, spraying or wiping to form a film. The diluent is permitted to evaporate. This can be accomplished by heating to 50-200° C. or by simple exposure to ambient temperature, that is, from 20-25° C. It is believed that the resulting film is in the form of a polymeric metal oxide in multilayer form with unreacted alkoxide and hydroxyl groups. This is accomplished by depositing the film under conditions resulting in hydrolysis and self-condensation of the alkoxide. These reactions result in a polymeric coating being formed that provides cohesive strength to the film. The conditions necessary for these reactions to occur is to deposit the film in the presence of water, such as a moisture-containing atmosphere, however, these reactions can be performed in solution by the careful addition of water. The resulting film has some unreacted alkoxide groups and/or hydroxyl groups for subsequent reaction and covalent bonding with the organophosphorus over layer material. However, for readily coreactive groups, ambient temperatures, that is, 20° C., may be sufficient. Although not intending to be bound by any theory, it is believed the polymeric metal oxide is of the structure:

$$[M(O)_x(OH)_y(OR)_z]_n$$

where M is the metal of the invention, R is an alkyl group containing from 1 to 30 carbon atoms; x+y+z=V, the valence of M; x is at least 1, y is at least 1, z is at least 1; x=V−y−z; y=V−x−z; z=V−x−y; n is greater than 2, such as 2 to 1000.

The resulting film typically has a thickness of 0.5 to 100 nanometers. For other applications, thicker films can be used. When the organometallic compound is used neat and applied by chemical vapor deposition techniques in the absence of moisture, a thin metal alkoxide film is believed to form. Polymerization, if any occurs, is minimized and the film may be in monolayer configuration. When the organometallic compound is subjected to hydrolysis and self-condensation conditions as mentioned above, thicker films are formed.

Although not intending to be bound by any theory, it is believed the functional groups such as the acid or acid derivative groups of the organophosphorus compound covalently bond with the hydroxyl or alkoxide group of the organometallic coating, resulting in a durable film. It is believed that the organophosphorus compounds form a self-assembled layer that may be at least in part a monolayer on the surface of the substrate as generally described above.

The following Examples show the preparation and testing of razor blades coated with an organophosphorus compound in accordance with the present invention.

EXAMPLES

Example 1

Figure 1A:
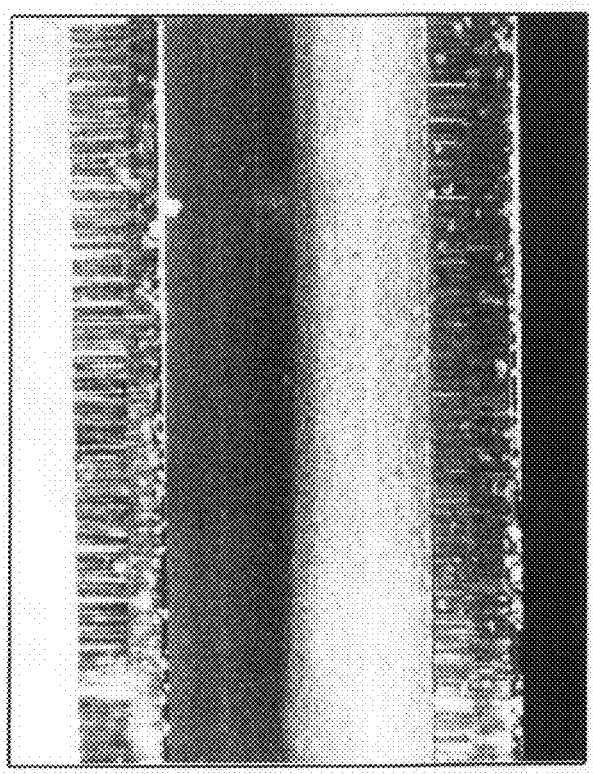
Figures 2A, 2B:
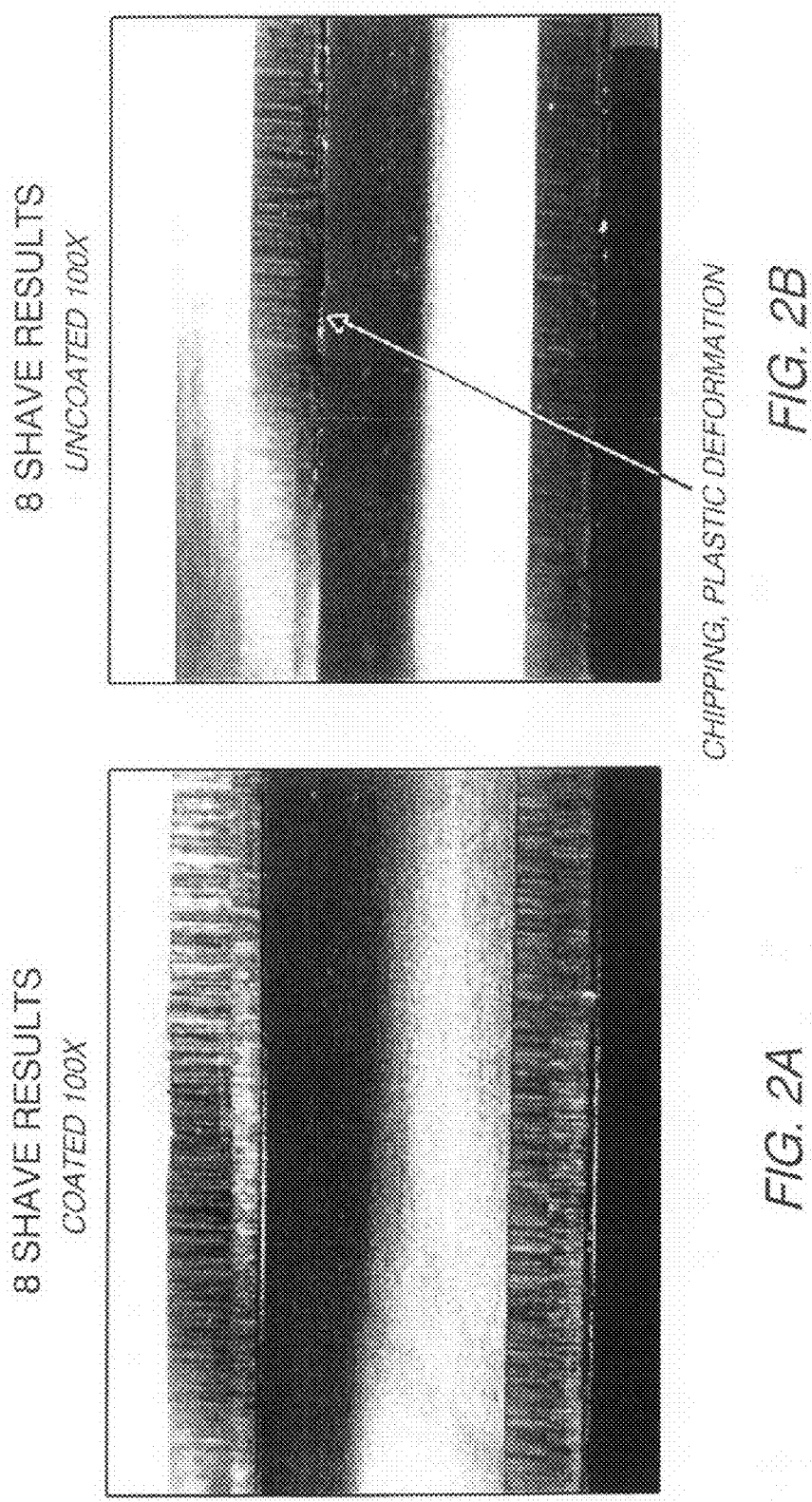
FIG. 2 is a Scanning Electron Micrograph similar to FIG. 1 but after eight (8) shaves.
Figure 3A:
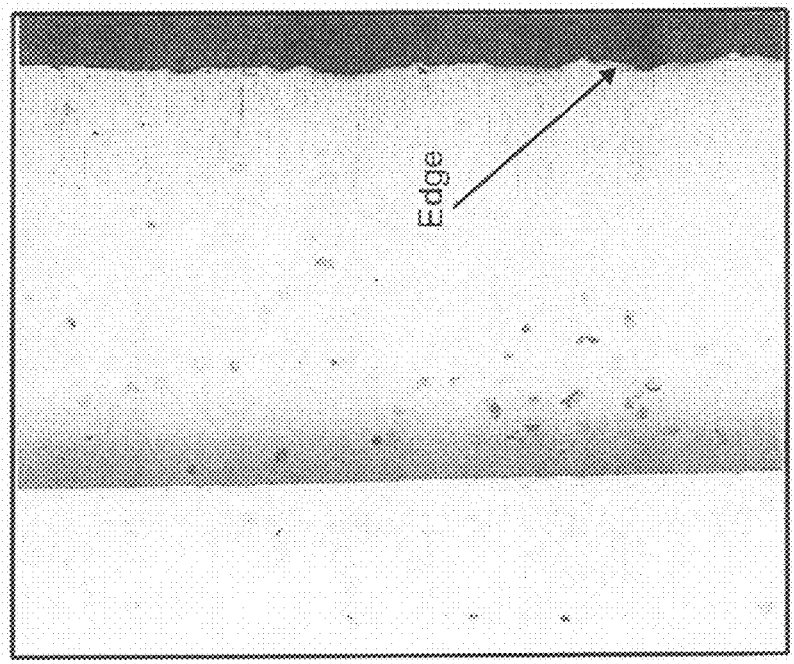
FIG. 3 is a Scanning Electron Micrograph similar to FIGS. 1 and 2 but at 94×. The blade to the left ("A") was coated with the organophosphorus compound in accordance with the invention and the blade to the right ("B") was uncoated.
Figure 3B:
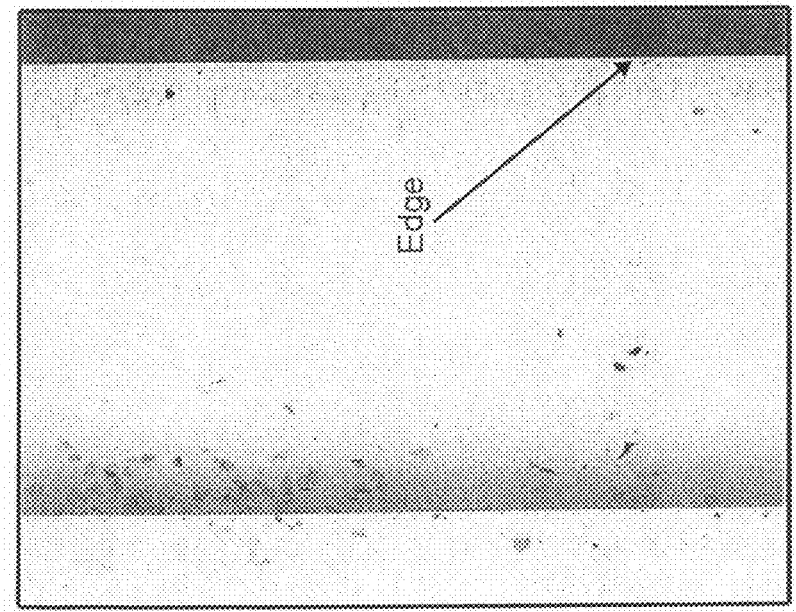

An organophosphorus compound of the following structure:

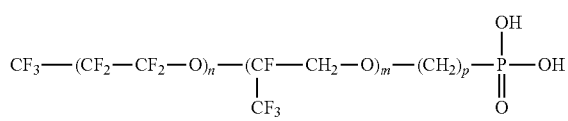

where n=1-14; m=1 and p=3 was first dissolved in 10 mL HFE-7100 (3M Innovative Products) followed by addition of 90 mL of methanol (Fisher). A 2-blade shaving razor (Schick) was coated with a film of the organophosphorus compound by dipping the razor into the solution for 30 seconds. The razor was removed and allowed to dry at room temperature. A self-assembled monolayer was deposited on the surface of the razor blade and had a thickness less than 5 nanometers. Treated and untreated razors were used for 15 shaves each and scanning electron microscope images of the used blades were taken. After the 5$^{th}$, 8$^{th}$ and 15$^{th}$ shave, as shown in FIGS. 1-3, obvious wear and chipping was observed on the untreated blade, whereas the treated razor appeared to be unchanged.

The invention is now set forth in the following claims.

What is claimed is:

1. A cutting tool having a cutting edge with a coating of an organophosphorus acid or a derivative thereof having a fluorinated substituent adhered directly or indirectly to the cutting edge.

2. The cutting tool of claim 1 in which the cutting tool is metal.

3. The cutting tool of claim 2 in which the metal is steel.

4. The cutting tool of claim 2 in which the metal is stainless steel.

5. The cutting tool of claim 2 in which the metal has a hard coating applied to the cutting edge.

6. The cutting tool of claim 1, which is a razor blade.

7. The cutting tool of claim 1 in which the organophosphorus acid or derivative thereof is selected from a phosphoric acid, a phosphonic acid, a phosphinic acid including derivatives thereof.

8. The cutting tool of claim 1 in which the fluorinated substituent is perfluoro group.

9. The cutting tool of claim 1 in which the organophosphorus acid or derivative thereof is of the following structure:

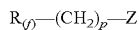

where R$_f$ is a perfluorinated alkyl group or a perfluoroalkylene ether group, p is an integer ranging from 0 to 20 and Z is a phosphorus acid group or an acid derivative thereof.

10. The cutting tool of claim 9 in which R$_f$ is a perfluorinated alkyl group of the structure:

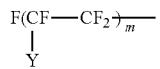

where Y is F or C$_n$F$_{2n+1}$; m is 2 to 20 and n is 1 to 20.

11. The cutting tool of claim 9 in which R$_f$ is a perfluoroalkylene ether group of the structure:

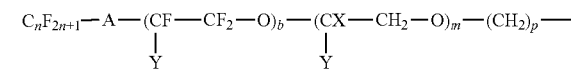

where A is an oxygen radical or a chemical bond; n is 1 to 20; Y is H, F, C$_n$H$_{2n+1}$ or C$_n$F$_{2n+1}$; b is at least 1; X is H or F; m is 0 to 50 and p is 0 to 20.

12. The cutting tool of claim 9 in which Z is selected from:

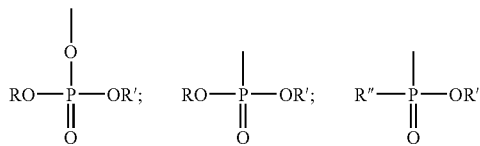

where R" is a hydrocarbon or substituted hydrocarbon radical having up to 200 carbon atoms and R and R' are selected from H, a metal, an amine or an aliphatic or substituted aliphatic radical having 1 to 50 carbon atoms or an aryl or substituted aryl radical having 6 to 50 carbon atoms.

13. The cutting tool of claim 12 in which Z is

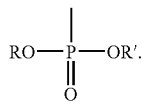

14. The cutting tool of claim 1 in which the coating has a thickness of less than 100 nanometers.

15. The cutting tool of claim 1 in which the coating is self-assembled with the phosphorus atoms forming the head and the organo groups forming the tail.

16. The cutting tool of claim 15 in which the coating is in a self-assembled monolayer configuration.

17. The cutting tool of claim 16, which has excess organophosphorus compound on the monolayer.

18. The cutting tool of claim 16, which has a layer of polytetrafluoroethylene on the monolayer.

19. The cutting tool of claim 1 in which the organophosphorus acid or derivative thereof is adhered to the cutting edge through an intermediate organometallic layer.

20. The cutting tool of claim 19 in which the organometallic layer is a polymeric metal oxide having unreacted alkoxide and/or hydroxyl groups.

21. The cutting tool of claim 20 in which the organometallic layer is of the structure:

where M is a metal, R is an alkyl group containing from 1 to 30 carbon atoms; x+y+z=V, the valence of M; x is at least 1, y is at least 1, z is at least 1; x=V−y−z; y=V−x−z; z=V−x−y; n is greater than 2.

22. The cutting tool of claim 1 in which the cutting edge has a radius of curvature of from 25 angstroms to several microns.

23. The cutting tool of claim 1 in which the cutting edge has a radius of curvature of from 75 angstroms to 1000 angstroms.

* * * * *